United States Patent [19]

Roderick et al.

[11] Patent Number: 5,040,157

[45] Date of Patent: Aug. 13, 1991

[54] EXPENDABLE VIRTUAL VERTICAL SENSING ARRAY

[75] Inventors: William I. Roderick, Stonington; William A. Von Winkle, New London, both of Conn.

[73] Assignee: The United States of America as represented by the Secretary of the Navy, Washington, Pa.

[21] Appl. No.: 601,213

[22] Filed: Oct. 15, 1990

[51] Int. Cl.$^5$ .......................... G01S 3/80; H04B 1/59
[52] U.S. Cl. ................................. 367/119; 367/124; 367/3
[58] Field of Search .................. 367/3, 5, 118, 119, 367/124, 129, 131

[56] References Cited

U.S. PATENT DOCUMENTS

| | | | |
|---|---|---|---|
| 3,982,222 | 9/1976 | Urick | 367/3 |
| 4,093,934 | 6/1978 | Urick et al. | 367/3 |
| 4,446,542 | 5/1984 | Beckerle | 367/131 |

OTHER PUBLICATIONS

Autrey, S. W., "Passive Synthetic Arrays," *Journal of Acoust. Soc. of Amer.*, vol. 84, #2, Aug. 1988.
Buchner, H. P., "Use of Calculated Sound Fields and Matched Field Detection to Locate Sound Sources in Shallow Water," *J. Acoust. Soc. of Amer.*, vol. 59, #2, Feb. 1976.

*Primary Examiner*—Ian J. Lobo
*Attorney, Agent, or Firm*—Michael J. McGowan; Prithvi C. Lall; Michael F. Oglo

[57] ABSTRACT

A method and apparatus of determining the range and depth of a far field underwater target is provided. A multi-sensor device is released into the water from a surface ship or other deploying platform and allowed to exhibit vertical free-fall in the water. Acoustic field, temperature and depth information are received from the multi-sensor device at depth points along the free-fall. The depth points from a virtual vertical aperture. The acoustic field, temperature and depth information at the depth points are inputs of a virtual vertical sensing array used to determine the range with depth of the target.

13 Claims, 1 Drawing Sheet

EXPENDABLE VIRTUAL VERTICAL SENSING ARRAY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to underwater acoustic sensing devices and more particularly to an expendable underwater acoustic sensing device that forms a virtual vertical sensing array.

(2) Description of the Prior Art

Acoustical sensors have been used for some time to localize an underwater target. Presently, horizontal arrays of these acoustical sensors are towed behind a moving vessel. Target range and depth localization from towed array data is often limited due to poor propagation from the target to the receiving towed array. To obtain the necessary range and depth information, towed arrays generally use multipath ranging algorithms which may not provide successful predictions due to poor signal-to-noise ratios and inadequate multipath information. Accordingly, this method is not always successful in achieving a real-time depth and target localization scheme. Furthermore, use of several systems to obtain this information is not cost-effective.

SUMMARY OF THE INVENTION

Accordingly, it is an object of the present invention to provide a method and apparatus for determining the real-time range and depth of a far field underwater target.

Another object of the present invention is to provide a method and apparatus for determining real-time range and depth information utilizing cost-effective technologies.

Other objects and advantages of the present invention will become more obvious hereinafter in the specification and drawings.

In accordance with the present invention, a method and apparatus are provided for determining the range and depth of a far field underwater target. A multi-sensor device is released from a host platform into the water. The multi-sensor device is sufficiently weighted to free-fall through the water thereby forming a virtual vertical aperture. Acoustic field, temperature and depth information is transmitted from the device to the host platform, via a communication line connecting the device to the host platform. The information transmitted at depth points along the virtual vertical aperture comprise outputs from the multi-sensor device. The device outputs of temperature and depth are processed by a first beamformer to generate a predicted complex acoustic pressure at specified target ranges and target depths. The array inputs of the acoustic field are processed by a second beamformer to generate a measured complex acoustic pressure. The predicted and measured complex acoustic pressures are then correlated to determine the estimated range and depth of the target. An added feature of the present invention is its expendability. Once the inputs of the virtual vertical array are accumulated, the communication line may be disconnected since only a single, inexpensive multi-sensor device is required to generate a very large, virtual vertical sensing array.

DESCRIPTION OF THE PREFERRED EMBODIMENTS

Figure 1:
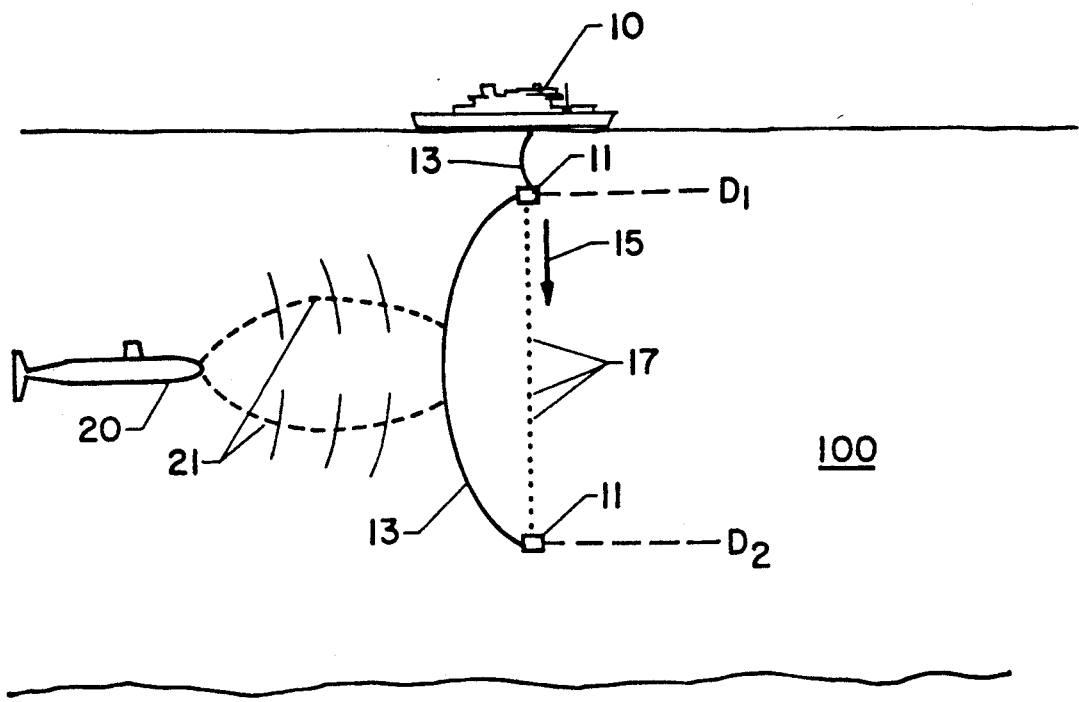
FIG. 1 is a schematic illustration of the use of a virtual vertical sensing array according to the method and apparatus of the present invention.

In order to better understand the method and apparatus of the present invention, its use will be described with reference to the scenario shown schematically in FIG. 1. However, as will be readily apparent, the method and apparatus of the present invention will apply to many scenarios. In FIG. 1, a surface ship 10 is attempting to determine the range and depth of an underwater target 20. The method and apparatus of the present invention achieves this end quickly and inexpensively through the use of a single, multi-sensor device 11. Multi-sensor device 11 consists of an omnidirectional hydrophone, a thermistor and a pressure sensor for measuring an acoustic field, temperature, and depth, respectively. For purposes of describing the present invention, it is sufficient that multi-sensor device 11 is capable of measuring these quantities. Accordingly, the configuration of multi-sensor device 11 is merely a choice of design and has thus been omitted from the description for sake of simplicity.

Multi-sensor device 11 is released into the water 100 from surface ship 10. Multi-sensor device 11 maintains communication with surface ship 10 via communication line 13. Communication line 13 may be either an electrical or fiber optic communication line. Multi-sensor device 11 must be sufficiently weighted to exhibit a vertical free-fall through the water 100. Accordingly, communication line 13 is shown as having sufficient slack to permit such free-fall.

As multi-sensor device 11 free-falls from a depth $D_1$ to a depth $D_2$, as indicated generally by arrow 15, a very-large virtual or synthetic aperture is formed between $D_1$ and $D_2$. At numerous depth points 17 between depths $D_1$ and $D_2$, acoustic field, temperature and depth information is transmitted from multi-sensor device 11 to surface ship 10. This information will also be referred to hereinafter as wet-end information. The wet-end information at depth points 17 comprise the inputs of a virtual vertical array between depths $D_1$ and $D_2$. In the preferred embodiment, creation of the virtual vertical array is dependent upon:

1) the target 20 being in the far field of the synthetic aperture formed between depths $D_1$ and $D_2$, 2) the acoustic field 21 of target 20 having spatial and temporal coherency across the aperture, and 3) the errors in the estimated depth of the multi-sensor device 11 being much smaller than the wavelength of acoustic field 21.

Figure 2:
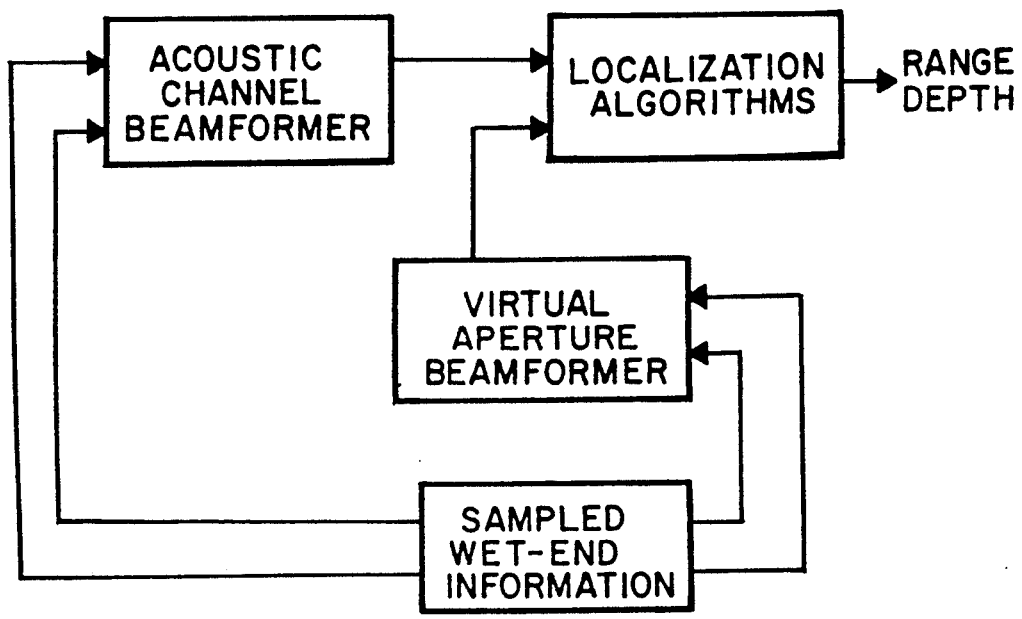
FIG. 2 is a block diagram of the dry-end processing according to the method and apparatus of the present invention.

The wet-end information is typically processed on board surface ship 10. This "dry-end" processing, as it will also be referred to hereinafter, will be described with reference to the block diagram in FIG. 2. Wet-end information from the virtual vertical array between depths $D_1$ and $D_2$ is sampled and multiplexed before undergoing dry-end processing.

From the temperature and depth data, an acoustic channel beamformer first computes the in situ sound velocity profile of water 100 along the virtual aperture formed between depths $D_1$ and $D_2$. This information may be further supplemented with archival data for the deeper depths. A complex acoustic pressure field is then predicted for specified target range and target depths at specified frequencies. The complex acoustic pressure is predicted from well known propagation models such as ray acoustics, normal mode, or parabolic equation methods. Predictions are developed as a function of target ranges and target depths and output to localization algorithms.

The vertical acoustic field and depth data are processed by a virtual aperture beamformer. The output of the virtual beamformer is the measured complex acoustic pressure along the virtual aperture formed between depths $D_1$ and $D_2$. Localization algorithms such as matched field algorithms (or least means square algorithms) compare the measured complex acoustic pressure to the predicted pressure as a function of target range and depth. The "best fit" between the measured and the predicted complex acoustic pressures determines the target range and depth. Alternatively, localization algorithms might be employed based upon a signal-to-noise ratio. The greatest signal-to-noise ratio would indicate the target range and depth.

The advantages of the present invention are numerous. Simultaneous accumulation of acoustic field, temperature and depth information is used in a real-time processing scheme to determine the range and depth of an underwater target. A single, multi-sensor device forms a very large, virtual vertical aperture from which wet-end information at various depth points simulates a very large vertical sensing array. Since only a single multi-sensor device is required, the apparatus of the present invention is cost effective and may be made expendable by merely disconnecting the device from its communication line.

The method and apparatus of the present invention are not limited to the scenario just described. Multi-sensor device 11 may be deployed from any platform such as a submarine or surface buoy. Also, dry-end processing need not take place on the deploying platform. For example, if a surface buoy were used as a deploying platform for the multi-sensor device 11, the wet-end information might be transmitted via radio frequency to a remote dry-end processing site.

Another alternative in the method and apparatus of the present invention would be to employ a multi-sensor device having only a hydrophone and a thermistor. If such an apparatus were used, pressure (i.e., depth) information could be determined from the sound velocity profile of the water and the free-fall rate of the multi-sensor device. A still further alternative would be to replace the single hydrophone with an array of omni-directional hydrophones. While adding to the cost of the apparatus, especially in the expendable mode, an array of hydrophones would be less susceptible to noise interference. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of determining range and depth of a far field underwater target, comprising the steps of:
   releasing a multi-sensor device into the water, the device having means for simultaneously sensing an acoustic field, temperature and depth of the water around the device at preselected depth points, said sensing means further including an omni-directional hydrophone, a thermistor and a pressure sensor, wherein the device exhibits free-fall in the water and said depth points form a virtual vertical aperture as said device falls through the water;
   providing a communication line between a measurement means and the free-falling device;
   transmitting acoustic field, temperature and depth information at each said depth point along the virtual vertical aperture from the free-falling device to the measurement means via the communication line;
   predicting a complex acoustic pressure at specified target ranges and target depths based on the acoustical channel temperature and depth information measured over the vertical virtual aperture by the free-falling device;
   processing the transmitted acoustic field information as a function of the depth of the free-falling device to generate a measured complex acoustic pressure; and
   comparing the predicted and measured complex acoustic pressures using localization algorithms wherein a best fit between predicted and measured is indicative of the range and depth of the target.

2. A method according to claim 1 further comprising the step of disconnecting the communication line from the measurement means after said step of receiving.

3. A method according to claim 2 further comprising the step of weighting the multi-sensor device to attain free-fall in the water.

4. A method according to claim 3 wherein said step of predicting comprises the steps of:
   accumulating a temperature profile of the water from the temperature measurements taken at said depth points along the virtual vertical aperture;
   generating a sound velocity profile of the water from the temperature profile; and
   modeling the complex acoustic pressure from the sound velocity profile and the depth information for the specified target ranges and target depths.

5. A method according to claim 4 including the step of determining the depth information from the generated sound velocity profile.

6. A method according to claim 5, wherein said step of processing comprises the steps of:
   accumulating an acoustic field profile along the virtual vertical aperture; and
   processing the acoustic field profile according to beamforming techniques to generate the measured complex acoustic pressure.

7. A method according to claim 6 wherein said step of comparing is accomplished with a least mean square statistical comparison.

8. A method according to claim 6 wherein said step of comparing is accomplished by a signal-to-noise ratio comparison.

9. An apparatus for determining the range and depth of a far field underwater target, comprising:
   means for simultaneously sensing and transmitting
   (1) an acoustic field generated by the target, and (2) temperature and depth of the water at preselected depths, as said sensing and transmitting means free-falls vertically through the water;

means for receiving the transmitted acoustic field, temperature and depth information at the depth points along the vertical free-fall wherein the information at the depth points comprises inputs of a virtual vertical array;

a first beamforming means for processing the transmitted temperature and depth information from said virtual vertical array at specified target ranges and target depths to generate a predicted complex acoustic pressure;

a second beamforming means for processing the transmitted acoustic field from said virtual vertical array to generate a measured complex acoustic pressure; and means for comparing the predicted and measured complex acoustic pressures, wherein a best fit of said preselected and said measure complex acoustic pressures is indicative of the range and depth of the target.

10. An apparatus as in claim 9 wherein said sensing and transmitting means comprises:
a hydrophone for sensing the acoustic field;
a thermistor for sensing the temperature of the water;
a pressure sensor for sensing the depth of the water; and
a communication line connecting said hydrophone, said thermistor and said pressure sensor to said first and second beamforming means.

11. An apparatus as in claim 10 wherein said communication line is an electrical communication line.

12. An apparatus as in claim 10 wherein said communication line is a fiber optic communication line.

13. An apparatus as in claim 9 wherein said sensing and transmitting means comprises:
a hydrophone for sensing the acoustic field;
a thermistor for sensing the temperature of the water;
a communication line connecting said hydrophone and said thermistor to said first and second beamforming means; and
means for generating a sound velocity profile of the water from the temperature and for determining the depth of the water from the sound velocity profile.

* * * * *